(12) United States Patent
Heusermann et al.

(10) Patent No.: US 7,627,585 B2
(45) Date of Patent: Dec. 1, 2009

(54) DATA STRUCTURE MAPPING AND PACKAGING

(75) Inventors: Knut Heusermann, Rauenberg (DE); Wolfram Siefke, Heidelberg (DE); Gordon Muehl, Oestringen (DE)

(73) Assignee: SAP AG, Walldorf (DE)

( * ) Notice: Subject to any disclaimer, the term of this patent is extended or adjusted under 35 U.S.C. 154(b) by 1334 days.

(21) Appl. No.: 10/308,852

(22) Filed: Dec. 2, 2002

(65) Prior Publication Data
US 2004/0139221 A1 Jul. 15, 2004

(51) Int. Cl.
G06F 17/00 (2006.01)
G06F 7/00 (2006.01)
G06F 15/16 (2006.01)

(52) U.S. Cl. .................. 707/101; 707/104.1; 709/236

(58) Field of Classification Search ............... 707/101, 707/104.1; 709/236
See application file for complete search history.

(56) References Cited

U.S. PATENT DOCUMENTS

| | | | | |
|---|---|---|---|---|
| 4,459,658 A | * | 7/1984 | Gabbe et al. | 714/6 |
| 4,768,149 A | * | 8/1988 | Konopik et al. | 710/47 |
| 4,803,651 A | * | 2/1989 | Galkowski | 703/27 |
| 5,129,083 A | * | 7/1992 | Cutler et al. | 707/103 R |
| 5,247,658 A | * | 9/1993 | Barrett et al. | 707/1 |
| 5,263,160 A | * | 11/1993 | Porter et al. | 707/3 |
| 5,359,724 A | * | 10/1994 | Earle | 707/205 |
| 5,440,744 A | * | 8/1995 | Jacobson et al. | 709/203 |
| 5,467,472 A | * | 11/1995 | Williams et al. | 707/1 |
| 5,630,125 A | * | 5/1997 | Zellweger | 707/103 R |
| 5,652,882 A | * | 7/1997 | Doktor | 707/201 |
| 5,675,784 A | * | 10/1997 | Maxwell et al. | 707/100 |
| 5,680,616 A | * | 10/1997 | Williams et al. | 707/103 R |
| 5,689,702 A | * | 11/1997 | Bulusu | 707/100 |
| 5,740,425 A | * | 4/1998 | Povilus | 707/100 |
| 5,758,353 A | * | 5/1998 | Marquis | 707/201 |
| 5,778,223 A | * | 7/1998 | Velissaropoulos et al. | 707/100 |
| 5,845,276 A | * | 12/1998 | Emerson et al. | 707/2 |
| 5,872,769 A | * | 2/1999 | Caldara et al. | 370/230 |
| 5,881,380 A | * | 3/1999 | Mochizuki et al. | 707/102 |
| 5,884,314 A | * | 3/1999 | Bulusu | 707/100 |
| 5,970,494 A | * | 10/1999 | Velissaropoulos et al. | 707/102 |

(Continued)

OTHER PUBLICATIONS

Parent, Christine, et al., "Spatio-Temporal Conceptual Models: Data Structures + Space + Time", ACM GIS '99, Kansas City, MO, Nov. 1999, pp. 26-33.*

(Continued)

*Primary Examiner*—Robert Stevens
(74) *Attorney, Agent, or Firm*—Schwegman, Lundberg & Woessner, P.A.

(57) ABSTRACT

A computer program product includes instructions operable to cause a data processing apparatus to receive a packed data structure, receive a linked data assemblage, identify a discrepancy between the packed data structure and the linked data assemblage, and update one of the packed data structure and the linked data assemblage to remove the discrepancy. In the packed data structure, a description of a relationship to a second element is included with a description of a first element. In the linked data assemblage, a description of the relationship between the first element and the second element is separate from the description of the first element and a description of the second element. The computer program product can be tangibly stored on a computer-readable medium.

8 Claims, 8 Drawing Sheets

U.S. PATENT DOCUMENTS

| | | | | |
|---|---|---|---|---|
| 6,131,098 | A * | 10/2000 | Zellweger | 707/102 |
| 6,138,123 | A * | 10/2000 | Rathbun | 707/201 |
| 6,170,742 | B1 * | 1/2001 | Yacoob | 235/375 |
| 6,223,342 | B1 * | 4/2001 | George | 717/116 |
| 6,233,540 | B1 * | 5/2001 | Schaumont et al. | 703/14 |
| 6,321,983 | B1 * | 11/2001 | Katayanagi et al. | 235/380 |
| 6,323,867 | B1 * | 11/2001 | Nookala et al. | 345/522 |
| 6,388,586 | B1 * | 5/2002 | Fischer et al. | 341/51 |
| 6,417,760 | B1 * | 7/2002 | Mabuchi et al. | 340/5.3 |
| 6,427,147 | B1 * | 7/2002 | Marquis | 707/4 |
| 6,470,490 | B1 * | 10/2002 | Hansen | 717/106 |
| 6,480,868 | B2 * | 11/2002 | Abdallah et al. | 708/204 |
| 6,502,115 | B2 * | 12/2002 | Abdallah et al. | 708/204 |
| 6,557,752 | B1 * | 5/2003 | Yacoob | 235/375 |
| 6,646,576 | B1 * | 11/2003 | Delvaux et al. | 341/60 |
| 6,819,986 | B2 * | 11/2004 | Hong et al. | 701/29 |
| 6,848,029 | B2 * | 1/2005 | Coldewey | 711/137 |
| 6,865,614 | B2 * | 3/2005 | Fischer et al. | 709/246 |
| 7,055,146 | B1 * | 5/2006 | Durr et al. | 717/162 |
| 7,124,302 | B2 * | 10/2006 | Ginter et al. | 713/189 |
| 2001/0042240 | A1 * | 11/2001 | Ng et al. | 717/3 |
| 2002/0188436 | A1 * | 12/2002 | Schmidt et al. | 704/1 |
| 2003/0014550 | A1 * | 1/2003 | Fischer et al. | 709/310 |
| 2003/0187856 | A1 * | 10/2003 | Luk et al. | 707/100 |
| 2004/0133747 | A1 * | 7/2004 | Coldewey | 711/137 |

OTHER PUBLICATIONS

Housel, Barron C., et al., "A High-Level Data Manipulation Language for Hierarchical Data Structures", Proceedings of the 1976 ACM Conference on Data: Abstraction, Definition and Structure, Salt Lake City, UT, Mar. 1976, pp. 155-169.*

Florescu, Daniela, et al., "Database Techniques for the World-Wide Web: A Survey", SIGMOD Record, vol. 27, No. 3, Sep. 1998, pp. 59-74.*

Batory, Don, et al., "Scalable Software Libraries", SIGSOFT '93, © 1993, pp. 191-199.*

Sirkin, Marty, et al., "Software Components in a Data Structure Precompiler", Proc. of the 15th International Conf. on Software Engineering, Baltimore, MD, © 1993, pp. 437-446.*

Zhang, Youtao, et al., "Data Compression Transformations for Dynamically Allocated Data Structures", CC 2002, LNCS 2304, Grenoble, France, Apr. 8-12, 2002, pp. 14-28.*

Driscoll, James R., et al., "Making Data Structures Persistent", Proc. of the 18th Annual ACM Symposium on Theory of Computing, Berkeley, CA, © 1986, pp. 109-121.*

Kernighan, Brian W., et al., The C Programming Language, Prentice-Hall, Inc., Englewood Cliffs, NJ, © 1978, pp. 128-141.*

Ferragina, Paolo, et al., "The String B-Tree: A New Data Structure for String Search in External Memory and Its Applications", Journal of the ACM, vol. 46, No. 2, Mar. 1999, pp. 236-280.*

Nazareth, J. L., "Implementation Aids for Optimization Algorithms that Solve Sequences of Linear Programs", ACM Transactions on Mathematical Software, vol. 12, No. 4, Dec. 1986, pp. 307-323.*

Moen, Sven, "Drawing Dynamic Trees", IEEE Software, vol. 7, Issue 4, Jul. 1990, pp. 21-28.*

Tsakalidis, Athanasios K., "Maintaining Order in a Generalized Linked List", Acta Informatica, Springer, Berlin, Germany, vol. 21, No. 1, May 1984, pp. 101-112.*

Hendren, Laurie J., et al., "Abstractions for Recursive Pointer Data Structures: Improving the Analysis and Transformation of Imperative Programs", ACM SIGPLAN Notices, vol. 27, Issue 7, Jul. 1992, pp. 249-260.*

Darragh, John J., et al., "Bonsai: A Compact Representation of Trees", Software—Practice and Experience, vol. 23, No. 3, Mar. 1993, pp. 277-291.*

Oberman, Stuart, et al., "AMD 3DNOW! Technology: Architecture and Implementations", IEEE Micro, Mar./Apr. 1999, pp. 37-48.*

Agarwal, S., et al., "Architecting Object Applications For High Performance With Relational Databases," Aug. 10, 1995, retrieved from the Internet on Dec. 7, 2004, at http://www-db.stanford.edu/pub/keller/1995/high-perf.pdf; 8 pgs., XP002295495.

Blaha, M.R., et al., "Relational Database Design Using an Object-Oriented Methodology," *Communications of the Association for Computing Machinery*, New York, US, v. 31, n. 4, Apr. 1, 1988, pp. 414-427, XP000005754.

Carey, Michael, et al., "O-O, What Have They Done to DB2?" *Proceedings of the 25$^{th}$ VLDB Conference*, 1999, retrieved from the Internet on Nov. 5, 2004, at http://www.vldb.org/conf/1999/P51.pdf, pp. 542-553, XP002304516.

"Mapping to Relational Databases," *eaa.book*, retrieved from the Internet on Nov. 6, 2004, at http://www.aw-bc.com/samplechapter/0321127420.pdf, pp. 33-53, XP002304515.

Meng, Weiyi, et al., "Transformation of Relational Schemas to Object-Oriented Schemas," Aug. 9, 1995, *Proceedings of the 19th International Computer Software and Applications Conference (COMPSAC'95)*, Dallas, Texas, pp. 356-361, XP010192752.

Noser, Hansrudi, et al., "Dynamic 3D Visualization of Database-Defined Tree Structures on the WWW by Using Rewriting Systems," *Proceedings of the International Workshop on Advance Issues of E-Commerce and Web-Based Information Systems*, Jun. 8, 2000, retrieved from the Internet on Dec. 7, 2004, at http://www.ifi.unizh.ch/~noser/BIBLIO/wecwis01.pdf, pp. 247-254, XP002262516.

School of Computer Science & Information Systems, "Access Databases—Introduction," *Introduction to Computing*, Oct. 1, 2002, retrieved from the Internet on Dec. 7, 2004, at http://www.dcs.bbk.ac.uk/~galitsky/ITC/access1.pdf, pp. 1-4, XP002304473.

* cited by examiner

DATA STRUCTURE MAPPING AND PACKAGING

BACKGROUND

This invention relates to data storage, data mapping, and data packaging.

A data structure is a group of component data variables and/or other structures that are associated with one another in a data storage device. Examples of common data structures include files, lists, arrays, records, trees, tables, and objects. The component data variables and/or other structures can be associated with each other in a number of different ways. For example, an array can include a pointer that identifies a particular data record. The identified data record can itself include a table and a data object.

The associations between components of a data structure can correspond to the relationships between elements of systems and articles. For example, an assembly line can include component workstations that are related by their position along the line. A data structure can include data objects that describe each workstation. The data objects can be associated with one another in a way that corresponds to the position of the workstations along the line. For example, each data object can include an identification of a subsequent workstation in the line.

SUMMARY

The present invention provides methods and apparatus, including computer program products, for mapping data structures describing articles or systems composed of elements. An article is a tangible object or device that is assembled from individual components. A system is a collection of items such as objects or devices that are related by some feature. For example, the items in a system can be related by function, by location, in time, by deployment, or by purpose.

In general, in one aspect, the invention features a method for mapping data structures describing articles or systems composed of elements. The method includes receiving a packed data structure where a description of a relationship to a second element is included with a description of a first element, separating the description of the first element from the description of the relationship, and associating the description of the relationship with an identifier of the description of one of the first element and the second element.

The invention can be implemented to include one or more of the following advantageous features. Receiving the packed data structure can include receiving information applicable to locating a description of the second element such as, e.g., a key applicable to searching a table to locate the description of the second element. Mapping data structures can also include changing the description of the relationship to the second element to information applicable to locating an identifier of the description of the second element. Associating the description of the relationship with the identifier of the description of the first element can include forming a data object that includes the description of the relationship and the identifier of the description of one of the first element and the second element.

Associating the description of the relationship with the identifier of the description of the first element can also include associating the description of the relationship with a key that identifies the description of the first element in a table. The packed data structure can be employed in a first computer system, application, or program. Associating the description of the relationship can include creating a data assemblage employed by a second system, application, or program. The data assemblage can be created, e.g., by creating a relationship data structure describing all relationships between elements. The relationship data structure can be, e.g., a relationship table describing all relationships between elements.

Mapping data structures can also include comparing the description of the relationship associated with the identifier of the description of the first element to a preexisting second description of a relationship associated with a second identifier of a description of an element, and updating one of the second description of a relationship, the second identifier of the description of the element, and the description of the element identified by the second identifier.

In general, in another aspect, the invention features a method for mapping data structures describing articles or systems composed of elements. The method can include receiving a linked data assemblage where a description of a relationship of a first element to a second element is separate from a further description of the first element, and merging the description of the first element with the description of the relationship.

The invention can be implemented to include one or more of the following advantageous features. Receiving the linked data assemblage can include receiving information describing an association between an identification of the second element and an identification of a description of the first element. The information describing the association can be, e.g., a node that includes the identification of the second element and the identification of the description of the first element. Receiving the linked data assemblage can include receiving a key applicable to search a table for the description of the first element, receiving information applicable to identify an identification of a description of the second element, and/or receiving the description of the relationship of the first element to the second element separately from the description of the first element and the description of the second element.

Merging the description of the first element with the description of the relationship can include appending the description of the relationship to the description of the first element or removing redundant information from the merged description of the first element and the description of the relationship.

In general, in another aspect, the invention features a computer program product that includes instructions operable to cause a data processing apparatus to receive a packed data structure, receive a linked data assemblage, identify a discrepancy between the packed data structure and the linked data assemblage, and update one of the packed data structure and the linked data assemblage to remove the discrepancy. In the packed data structure, a description of a relationship to a second element can be included with a description of a first element. In the linked data assemblage, a description of the relationship between the first element and the second element is separate from the description of the first element and a description of the second element. The computer program product can be tangibly stored on a computer-readable medium.

The invention can be implemented to include one or more of the following advantageous features. The instructions can also cause the data processing apparatus to compare the packed data structure to the linked data assemblage to identify the discrepancy. The instructions can also cause the data processing apparatus to create new nodes from the packed data structure, and compare the new nodes created from the packed data structure to nodes in the linked data assembly to identify the discrepancy.

The instructions can also cause the data processing apparatus to form data objects that include element description identifiers and association identifiers to create the nodes. The instructions can also cause the data processing apparatus to receive the packed data structure employed in a first computer system, application, or program, and receive the linked data assemblage employed in a second computer system, application, or program.

The invention can be implemented to realize one or more of the following advantages. Computer systems, applications, and programs that operate using different data storage approaches can exchange information by mapping data from one approach to another. This allows information stored using different approaches to be collected from multiple, heterogeneous systems, applications, and/or programs and applied to the same purpose.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
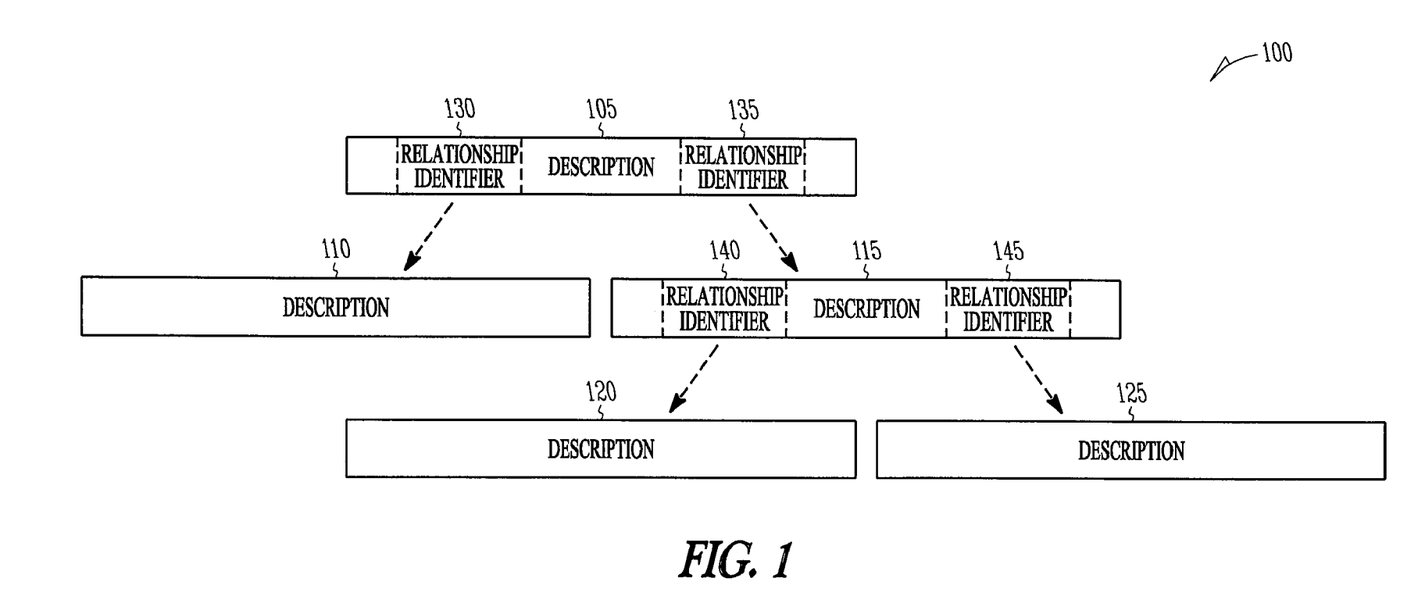
FIG. 1 shows an example of a packed data structure.

FIG. 1 shows a "packed" data structure 100 where information that identifies the relationships between elements is stored with descriptions of the elements themselves. Packed data structure 100 includes descriptions 105, 110, 115, 120, 125 of elements of a system or an article. Descriptions 105, 110, 115, 120, 125 describe various characteristics of the elements and can include, e.g., information describing operational characteristics, maintenance characteristics, and/or positional characteristics of the elements. Descriptions 105, 110, 115, 120, 125 can be, e.g., data objects, tables, or other data structures.

Description 105 includes relationship identifiers 130, 135. Relationship identifiers 130, 135 are data that can be used to locate element descriptions 110, 115 and thereby indicate relationships between the element described by description 105 and the elements described by descriptions 110, 115. Relationship identifiers 130, 135 can include, e.g., characteristics of the elements described by descriptions 110, 115 or an identification of the memory location of descriptions 110, 115. Relationship identifiers 130, 135 can be, e.g., keys, pointers, or other links that can be used to locate descriptions 110, 115.

Description 115 includes relationship identifiers 140, 145. Relationship identifiers 140, 145 are data that can be used to locate element descriptions 120, 125. Relationship identifiers 140, 145 identify relationships between the element described by description 115 and the elements described by descriptions 120, 125.

The relationships identified by relationship identifiers 130, 135, 140, 145 can correspond to physical interactions between elements of articles or systems. For example, the element described by description 110 can be a component of the element described by description 105. This may be the case, e.g., if description 110 describes a keyboard and description 105 describes a computer. As another example, the element described by description 115 can interact operationally with the element described by description 120. This may be the case, e.g., if description 120 describes a raw material and description 115 describes a device that processes that raw material.

Although FIG. 1 only shows relationship identifiers that identify subordinate elements, a packed data structure can also be formed using relationship identifiers that identify superordinate elements. For example, description 115 can include a relationship identifier (not shown) that can be used to locate element description 105. Moreover, both superordinate relationship identifiers and subordinate relationship identifiers can be included in the same packed data structure.

Figure 2:
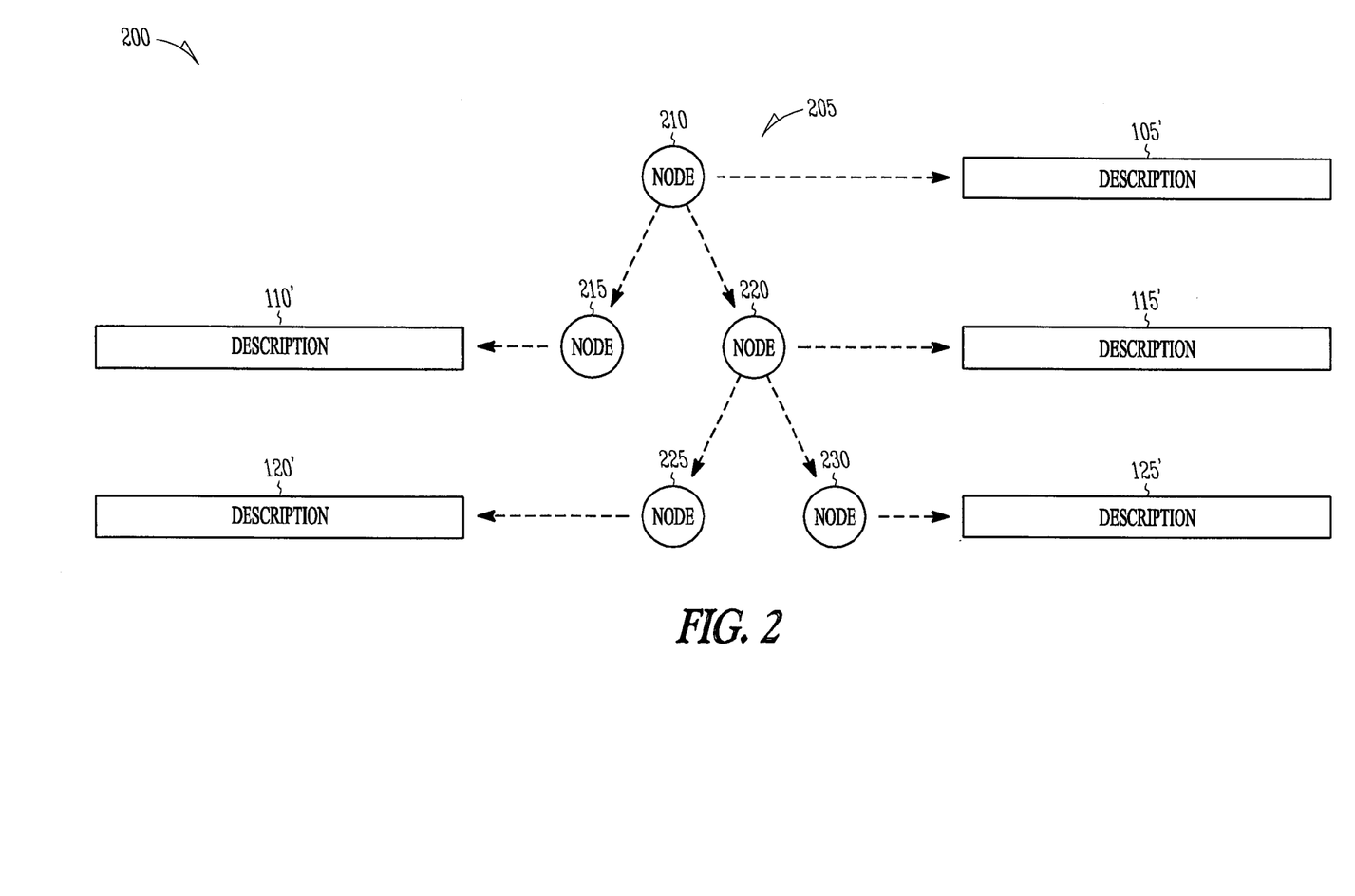
FIG. 2 shows an example of a linked data assemblage.

FIG. 2 shows a "linked" data assemblage 200 where a description of the relationships between articles is stored separately from descriptions of the articles themselves. In linked data assemblage 200, descriptions 105', 110', 115', 120', 125' all include a description of characteristics of an element. However, descriptions 105', 110', 115', 120', 125' are independent of an identification of the relationships between elements.

In linked data assemblage 200, the relationships between elements are described in a relationship data structure 205. The interactions between elements described by relationship data structure 205 can be similar to the relationships identified by relationship identifiers 130, 135, 140, 145. Relationship data structure 205 includes nodes 210, 215, 220, 225, 230. Nodes 210, 215, 220, 225, 230 do not themselves include a description of an element. Rather nodes 210, 215, 220, 225, 230 each include information that identifies a description of an element and can be said to "correspond" to that element.

Nodes 210, 215, 220, 225, 230 can also include information that identifies other node(s). In a node, information that identifies another node identifies a relationship between elements. In particular, the information identifies a relationship between the element that corresponds to the node and the element that corresponds to the other, identified node. For example, node 210 includes information that identifies description 105' and information that identifies nodes 215 and 220. Node 215 includes information that identifies description 110'. Node 220 includes information that identifies description 115' and information that identifies nodes 225 and 230. Node 225 includes information that identifies description 120'. Node 230 includes information that identifies description 125'.

Nodes 210, 215, 220, 225, 230 can be, e.g., data objects, tables, or other data structures. The information in nodes 210, 215, 220, 225, 230 that identifies other nodes and descriptions 105', 110', 115', 120', 125' can be, e.g., keys, pointers, or other links. Since relationship data structure 205 can identify the relevant element descriptions (e.g., descriptions 105', 110', 115', 120', 125') simply by maintaining a key that can be used when searching for relevant descriptions, data assemblage 200 is not necessarily a single data structure and is referred to as an assemblage.

Although data structure 205 only includes nodes that identify subordinate elements, a linked data assemblage can also be formed using nodes that include information identifying superordinate nodes. For example, node 220 can include information that can identifies node 210. Moreover, both information that identifies superordinate nodes and information that identifies subordinate nodes can be included in the same linked data assemblage and within the same node.

Figure 3:
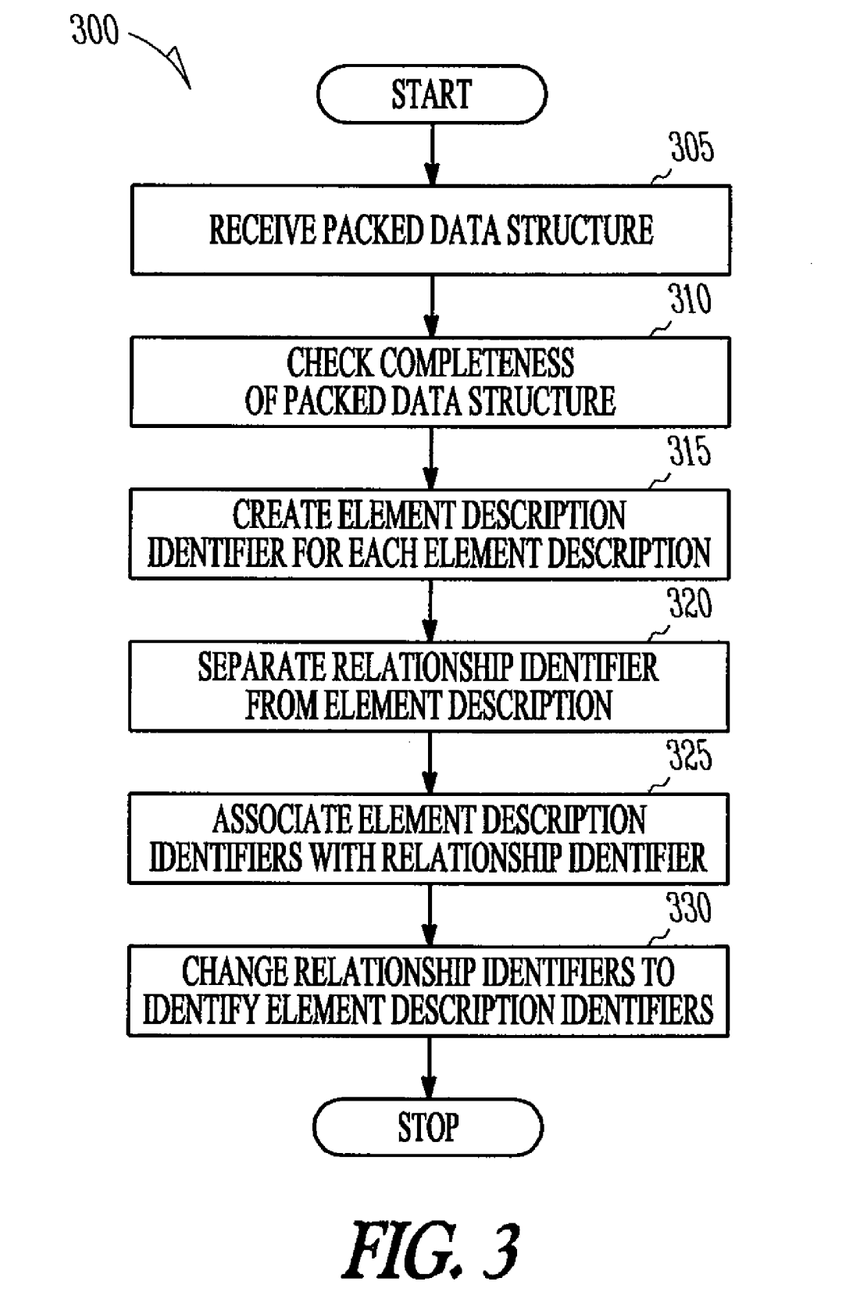
FIG. 3 shows a method for mapping a packed data structure into a linked data assemblage.

FIG. 3 shows a method 300 for mapping a packed data structure (where descriptions of the relationships between articles are stored with descriptions of the elements themselves) to a linked data assemblage (where a description of the relationships between elements is stored in a relationship data structure that identifies but does not include the descriptions of the articles). Mapping is a process whereby information that describes elements and the relationships between elements is transferred between a packed data structure and a linked data assemblage. For example, mapping in accordance with method 300 can result in the creation of a new linked data assemblage from a packed data structure. As another example, mapping in accordance with method 300 can be used to transfer changes to the description of elements and the description of relationships between elements in a packed data structure to a linked data assemblage.

A data processing system performing method 300 receives a packed data structure in an electronically-accessible format (step 305). The system can receive the packed data structure, e.g., by retrieving the packed data structure from a memory or over a communications link with another data processing system. After receipt, the system checks the completeness of the received stacked data structure (step 310). The system can check the completeness of the received data structure, e.g., by comparing the size of the packed data structure to an expected size of the packed data structure. The expected size can be described, e.g., in a separate data transmission or in the header of the packed data structure.

The data processing system also generates an element description identifier for each of the element descriptions in the packed data structure (step 315). The element description identifier can be formed, e.g., by copying a key that can be used to located the element description or creating a pointer that identifies the memory location of the element description. The data processing system also separates relationship identifiers from the element descriptions in the packed data structure (step 320). The system can deleted the relationship identifiers from the element descriptions after the system locates and separates the relationship identifiers.

Figure 4:
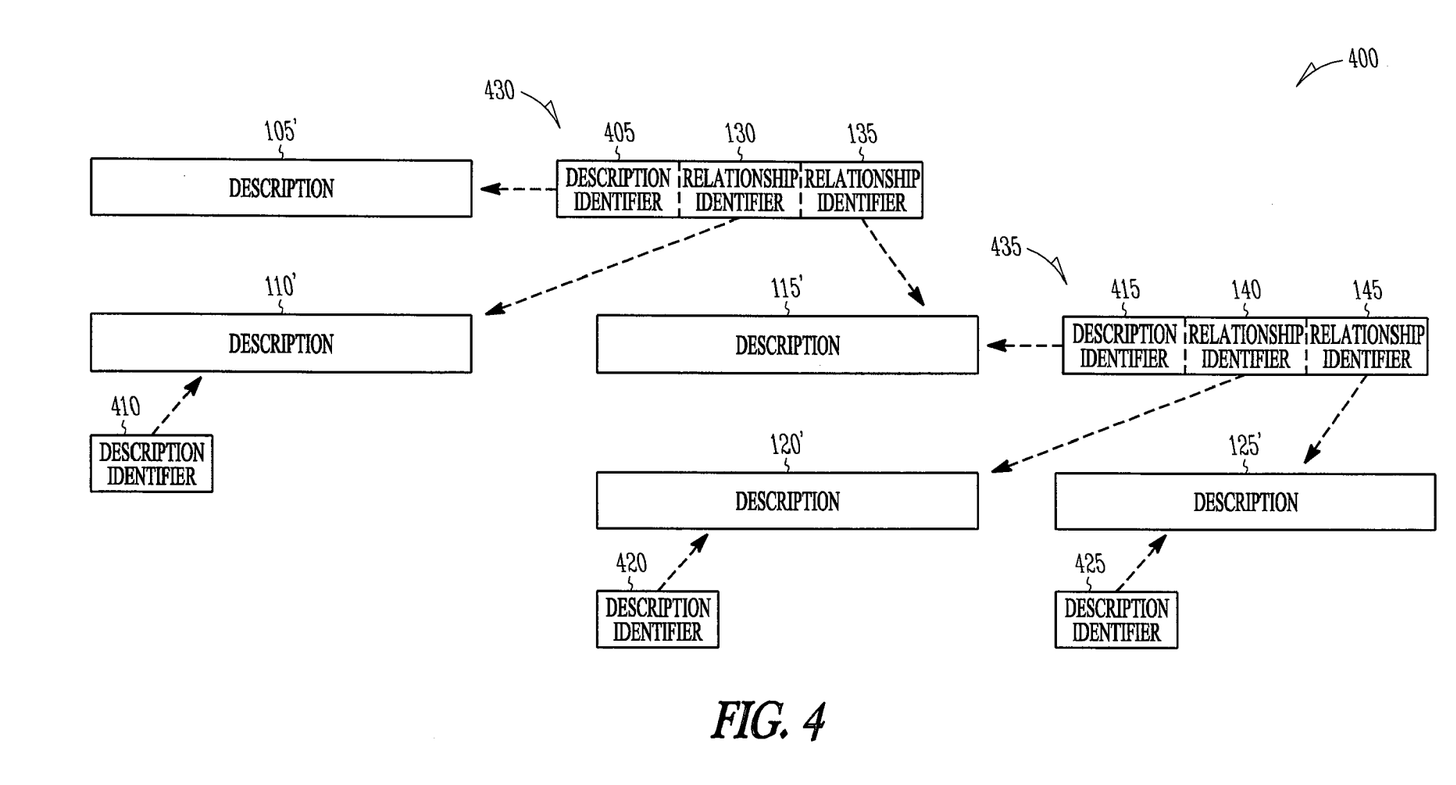
FIG. 4 shows a packed data structure during mapping using the method of FIG. 3.

The data processing system also associates each element description identifier with relationship identifiers that have been separated from the corresponding identified element description (step 325). The element description identifier can be associated with the relationship identifiers by, e.g., placement in a single data object or table. FIG. 4 shows a data collection 400 that results after the system performing method 300 performs step 325 upon data structure 100 (FIG. 1). In particular, data collection 400 includes element description identifiers 405, 410, 415, 420, 425. Element description identifier 405 identifies element description 105'. Element description identifier 410 identifies element description 110'. Element description identifier 415 identifies element description 115'. Element description identifier 420 identifies element description 120'. Element description identifier 425 identifies element description 125'.

Element descriptions 105', 110', 115', 120', 125' have been formed by separating relationship identifiers 130, 135, 140, 145 from element descriptions 105, 110, 115, 120, 125. After separation, relationship identifiers 130, 135, 140, 145 have been associated with the element description identifiers that identify the corresponding source element description. In particular, relationship identifiers 130, 135 have been associated with element description identifier 405 by common placement in a data object 430, and relationship identifiers 140, 145 have been associated with element description identifier 415 by common placement in a data object 435.

Figure 5:
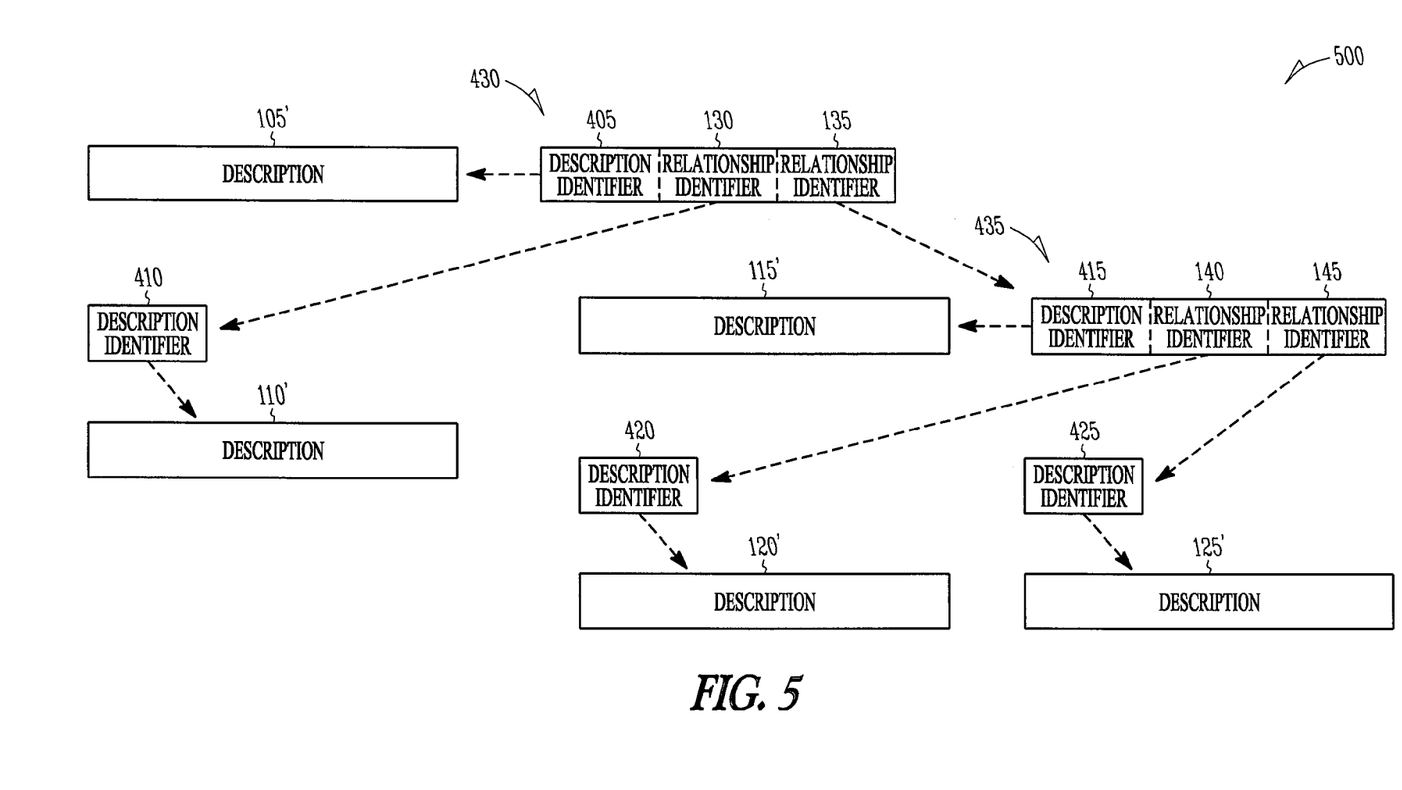
FIG. 5 shows the packed data of FIG. 4 after mapping.

Returning to FIG. 3, the data processing system performing method 300 changes the relationship identifiers to identify the element description identifiers (step 330). In particular, each relationship identifier is changed to identify the element description identifier that identifies the element description previously identified by the relationship identifier. For example, FIG. 5 shows data collection 500 after relationship identifiers 130, 135, 140, 145 have been changed. In particular, relationship identifier 130 identifies element description identifier 410, relationship identifier 135 identifies element description identifier 415, relationship identifier 140 identifies element description identifier 420, and relationship identifier 135 identifies element description identifier 425.

The changing of element description identifiers to identify other element description identifiers creates nodes from the element description identifiers. In other words, the element description identifier each include information that identifies a description of an element as well as information that identifies another element description identifier, creating a linked data assemblage.

Figure 6:
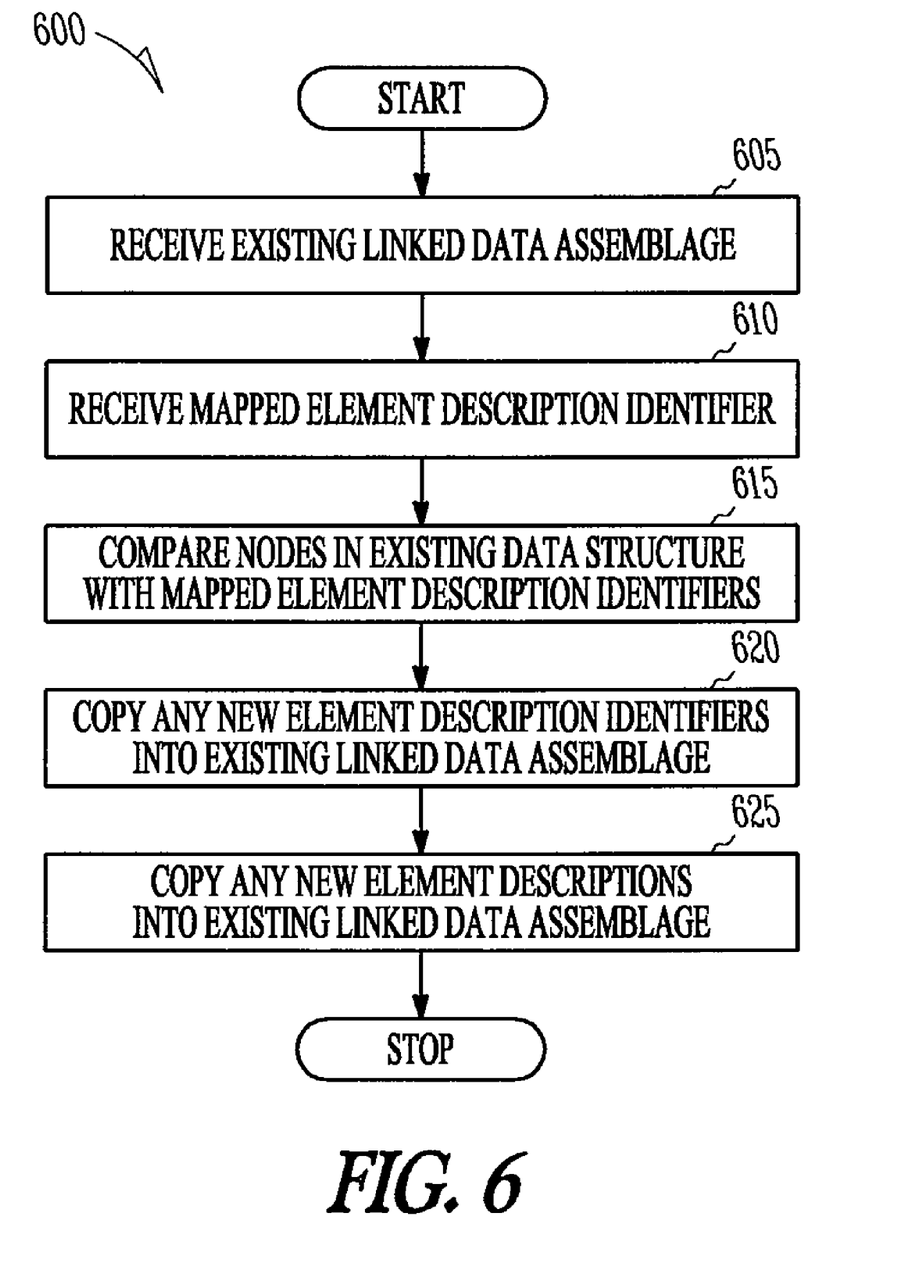
FIG. 6 shows a method for mapping a packed data structure into an existing linked data assemblage.

FIG. 6 shows an example of a method 600 for mapping a packed data structure into an existing linked data assemblage. Method 600 can be used, e.g., to transfer data between different systems, applications, or computer programs that operate with and make changes to the same data in different data structures. In particular, method 600 can be used to quickly update a linked data assemblage to reflect changes to a corresponding packed data structure.

A data processing system performing method 600 receives an existing linked data assemblage (step 605) and mapped element description identifiers (step 610) in, for example, electronically-accessible format. The system can receive the linked data assemblage and mapped element description identifiers, e.g., by retrieving them from a memory or over a communications link with another data processing system. The mapped element description identifiers can be extracted from a newly created linked data assemblage such as data structure 400 in FIG. 5.

After receipt, the system compares the nodes of the linked data assemblage with the mapped element description identifiers to identify discrepancies (step 615). For example, the system can identify corresponding pairs of mapped element description identifiers and nodes to determine if the element description identifiers have been newly created or recently changed. The corresponding pairs can identify the same relationships between elements and/or the same element descriptions. For example, in one pair, a node from the preexisting linked data assemblage can include information that identifies an associated node identifying a first element while the element description identifier can identify an associated element description identifier that identifies the same first element.

Based on the comparison, the system can identify and copy any new or changed element description identifiers (step 620) and any new or changed element descriptions (step 625) into the existing linked data assemblage. By limiting the data transfer to these portions of the entire data structure, the linked data assemblages can be updated more quickly and more often.

Figure 7:
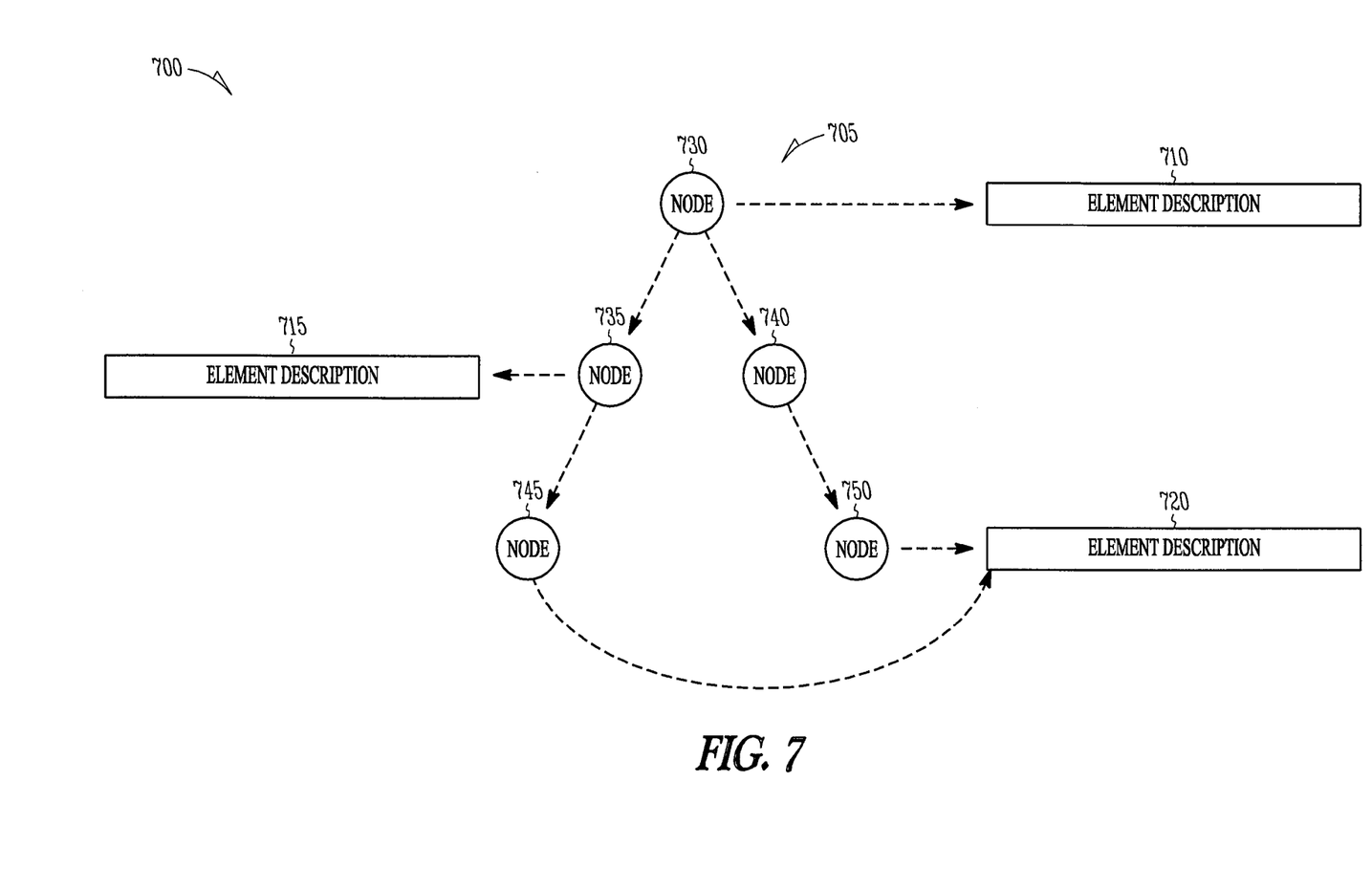
FIG. 7 shows another example of a linked data assemblage.

One peculiarity arises with an existing linked data assemblage when one of the nodes does not identify an element description. FIG. 7 shows an example of such a linked data assemblage 700. Linked data assemblage 700 includes a relationship data structure 705 and a collection of element descriptions 710, 715, 720. Relationship data structure 705 includes nodes 730, 735, 740, 745, 750. Node 730 includes information that identifies element description 710. Node 735 includes information that identifies element description 715. Nodes 745, 750 both include information that identifies element description 720. This may occur when element description 720 describes an element that appears more than one time in an article or a system. For example, element description 720 can describe an amplifier element, and a stereo article can use one copy of the amplifier element in a receiver amplifier and another copy of the amplifier element in a CD player.

In contrast with nodes 730, 735, 745, 750, node 740 does not identify a corresponding element description, hence creating a gap in the structure of linked data assemblage 700. Node 740 does not identify a corresponding element description because, for example, relationship data structure 705 is set to have a predefined, generic structure that does not correspond with the physical reality of a particular object or system. For example, relationship data structure 705 can be set to a predefined structure that relates to a generic CD player article. Node 740 can be included in relationship data structure 705 to correspond to a component that is not necessarily included in every CD player, such as, e.g., an infrared remote control receiver. Thus, when linked data assemblage 700 describes a CD player that does not include an infrared remote control receiver, node 740 does not identify a corresponding element description. As another example, when linked data assemblage 700 describes a system, and a component of the system fails or is missing, a node like node 740 need not identify a corresponding element description.

The gap in linked data assemblage 700 is not necessarily taken into account when mapping a packed data structure into an existing linked data assemblage 700 using a method such as method 600. In particular, when the data processing system that is performing the mapping seeks to compare the nodes in existing linked data assemblage 700 with mapped element description identifiers, more than one mapped element description identifier may correspond to node 740. For example, an element description identifier that corresponds to node 735 identifies a subordinate node (i.e., node 745) that identifies element description 720, and an element description identifier that corresponds to node 740 identifies a subordinate node (i.e., node 750) that identifies element description 720. In this case, if the element description identified by subordinate nodes is the sole criteria for comparing nodes to mapped element description identifiers, then a data processing system will be unable to perform method 600.

This situation can be addressed, e.g., by defining additional criteria for matching nodes to mapped element description identifiers, by constraining the types of changes that can be made to an existing data structure, or by constraining the separation of relationship identifiers from the element descriptions in the packed data structure to occur in a particular order. For example, the separation of relationship identifiers from the element descriptions can proceed bottom up through the packed data structure so that correspondence to nodes in the linked data assemblage can be identified.

Figure 8:
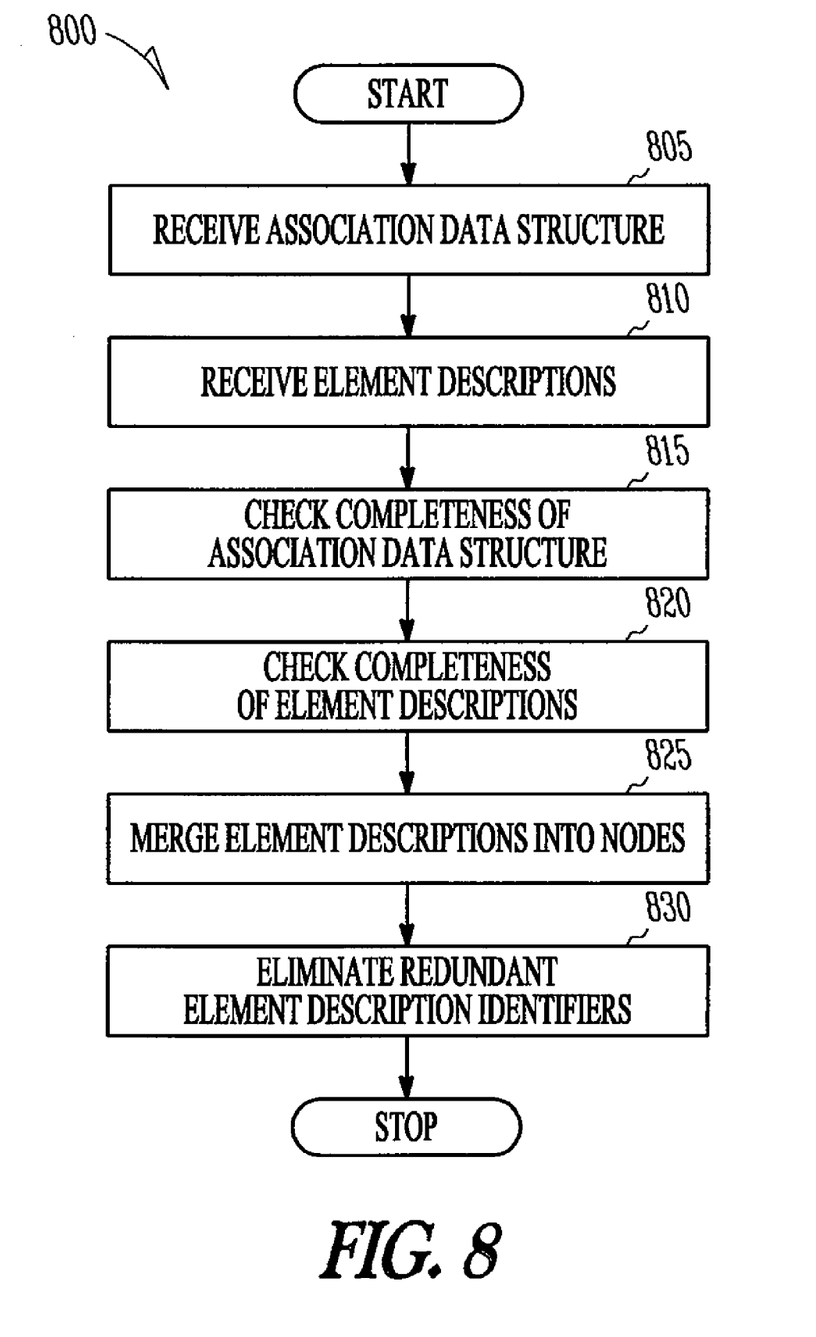
FIG. 8 shows a method for mapping a linked data assemblage into a packed data structure.

FIG. 8 shows a method 800 for mapping a linked data assemblage to a packed data structure. The data processing system performing method 800 can receive the linked data assemblage in two discrete data packages. In particular, the system can receive the relationship data structure that identifies the relationships between elements (step 805) and the descriptions of the element themselves (step 810) separately. The system can also check the completeness of each receive data package (steps 815, 820). For example, a description of the expected size of each package can be included in the header of each package or in a separate data transmission.

The system performing method 800 merges the received element descriptions into the nodes of the relationship data structure (step 825). For example, if the element description identifier is a key that can be used to locate an element description in a table, then a copy of the element description can be appended to the key. As a result of such a merging, the copied element descriptions now are associated with information that can be used to identify associated descriptions of elements.

The system can also eliminate redundant information from the element descriptions, as needed (step 830). For example, if a key that previously had been used to locate an element description contains information that is reproduced in the element description, this reproduced information can be eliminated to save memory.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

A number of embodiments of the invention have been described. Nevertheless, it will be understood that various modifications may be made without departing from the spirit and scope of the invention. Accordingly, other embodiments are within the scope of the following claims.

What is claimed is:

1. A method for creating a node associated with a linked data assemblage from a packed data structure, the method comprising:
   receiving the packed data structure that includes a first element description, the first element description further including a description of a relationship to a second element;
   generating an identifier of the first element description;
   separating the first element description from the description of the relationship to the second element;
   associating by way of a hardware-implemented module the description of the relationship to the second element with the identifier of the first element description, the association creating the node associated with the linked data assemblage; and
   changing the description of the relationship to the second element included in the node to information applicable to locating an identifier of a second element description.

2. The method of claim 1, wherein receiving the packed data structure further comprises:
   receiving information applicable to locating the second element description.

3. The method of claim 2, wherein receiving the packed data structure further comprises:
   receiving a key applicable to searching a table to locate the second element description.

4. The method of claim 1, wherein associating the description of the relationship to the second element with the identifier of the first element description comprises:
   associating the description of the relationship to the second element with a key that identifies the first element description in a table.

5. The method of claim 1, wherein:
   the packed data structure is employed in one or more of a first computer system, an application, or a program; and
   associating the description of the relationship to the second element comprises creating the linked data assemblage employed by one or more of a second system, an application, or a program.

6. The method of claim 5, wherein creating the linked data assemblage comprises:
   creating a relationship data structure describing all relationships between elements.

7. The method of claim 6, wherein creating the linked data assemblage further comprises:
   creating a relationship table describing all relationships between elements.

8. The method of claim 1, further comprising:
   comparing the description of the relationship to the second element associated with the identifier of the description of the first element to a preexisting second description of a relationship associated with a second identifier of a description of an element; and
   updating one of the second description of a relationship, the second identifier of the description of the element, and the description of the element identified by the second identifier.

* * * * *

UNITED STATES PATENT AND TRADEMARK OFFICE
CERTIFICATE OF CORRECTION

| | | |
|---|---|---|
| PATENT NO. | : 7,627,585 B2 | Page 1 of 1 |
| APPLICATION NO. | : 10/308852 | |
| DATED | : December 1, 2009 | |
| INVENTOR(S) | : Heusermann et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1734 days.

Signed and Sealed this

Second Day of November, 2010

David J. Kappos
*Director of the United States Patent and Trademark Office*